(12) United States Patent
Sepp et al.

(10) Patent No.: US 9,108,271 B2
(45) Date of Patent: *Aug. 18, 2015

(54) OBLIQUE LASER BEAM CUTTING

(75) Inventors: Florian Sepp, Altenstadt (DE); Volker Metsch, Ingersheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 448 days.

This patent is subject to a terminal disclaimer.

(21) Appl. No.: 12/976,327

(22) Filed: Dec. 22, 2010

(65) Prior Publication Data

US 2011/0120982 A1 May 26, 2011

Related U.S. Application Data

(63) Continuation of application No. PCT/DE2009/000911, filed on Jun. 26, 2009.

(30) Foreign Application Priority Data

Jun. 28, 2008 (DE) .......................... 10 2008 030 783

(51) Int. Cl.
*B23K 26/00* (2014.01)
*B23K 26/38* (2014.01)
*B23K 26/04* (2014.01)
*B23K 26/14* (2014.01)

(52) U.S. Cl.
CPC .............. *B23K 26/38* (2013.01); *B23K 26/041* (2013.01); *B23K 26/043* (2013.01); *B23K 26/048* (2013.01); *B23K 26/1441* (2013.01); *B23K 26/1476* (2013.01)

(58) Field of Classification Search
USPC .............................. 219/121.6, 121.72, 121.67
See application file for complete search history.

(56) References Cited

U.S. PATENT DOCUMENTS 3,597,578 A * 8/1971 Sullivan et al. .......... 219/121.67
3,965,328 A * 6/1976 Locke ...................... 219/121.72
(Continued)

FOREIGN PATENT DOCUMENTS

DE      19860585 A1     7/2000
DE   102005027836 A1   12/2006
(Continued)

OTHER PUBLICATIONS

Translation of relevant parts the office action of corresponding European Patent Application No. 09 768 834.5-2302, mailed Jun. 21, 2011, 2 pages.
(Continued)

*Primary Examiner* — Dana Ross
*Assistant Examiner* — Ayub Maye
(74) *Attorney, Agent, or Firm* — Fish & Richardson P.C.

(57) ABSTRACT

A method for oblique laser beam cutting of a workpiece and system for performing the same, in which a supersonic flow of cutting gas discharged from a cutting gas nozzle is orientated at an oblique cutting angle with respect to a surface of a workpiece, and in which the workpiece and the laser beam are moved relative to each other during the oblique laser beam cutting operation. The oblique cutting angle extends along a plane that is perpendicular to a direction of advance. During operation, the position of the laser beam on the workpiece surface is adjusted in such a manner that the laser beam strikes the workpiece surface in a high-pressure region formed within the supersonic flow of the cutting gas.

14 Claims, 3 Drawing Sheets

(56) References Cited

U.S. PATENT DOCUMENTS

| | | | |
|---|---|---|---|
| 4,205,828 A | | 6/1980 | Hooper et al. |
| 4,219,370 A | | 8/1980 | Hoaglin et al. |
| 5,059,759 A | | 10/1991 | Kudo et al. |
| 5,265,849 A | | 11/1993 | Yamashita |
| 5,286,006 A | | 2/1994 | Ogura |
| 5,340,962 A | * | 8/1994 | Schmidt et al. ......... 219/121.78 |
| 5,428,280 A | * | 6/1995 | Schmidt et al. ......... 318/568.11 |
| 5,463,202 A | | 10/1995 | Kurosawa et al. |
| 5,500,506 A | | 3/1996 | Lawson |
| 5,578,228 A | | 11/1996 | Beyer |
| 5,582,749 A | | 12/1996 | Mori et al. |
| 5,793,015 A | | 8/1998 | Walczyk |
| 5,847,358 A | * | 12/1998 | Franke et al. ......... 219/121.67 |
| 5,850,068 A | * | 12/1998 | Peters et al. ............. 219/121.83 |
| 6,133,541 A | | 10/2000 | Neubauer et al. |
| 6,201,207 B1 | | 3/2001 | Maruyama et al. |
| 6,326,588 B1 | | 12/2001 | Neubauer et al. |
| 6,423,928 B1 | * | 7/2002 | Piwczyk .................. 219/121.67 |
| 6,922,605 B1 | | 7/2005 | Olsen |
| 2003/0102294 A1 | * | 6/2003 | Kinbara et al. .......... 219/121.83 |
| 2004/0185758 A1 | | 9/2004 | Olsen |
| 2007/0228025 A1 | | 10/2007 | Horn et al. |

FOREIGN PATENT DOCUMENTS

| | | | | |
|---|---|---|---|---|
| EP | 0873813 A1 | | 10/1998 | |
| EP | 1149653 A2 | | 10/2001 | |
| EP | 1475182 A1 | | 11/2004 | |
| EP | 1684046 A1 | | 7/2006 | |
| FR | 2869559 A1 | | 11/2005 | |
| JP | 57100889 A | | 6/1982 | |
| JP | 02092485 A | * | 4/1990 | ............ B23K 26/06 |
| JP | 0557470 A | | 3/1993 | |
| JP | 0639571 A | | 2/1994 | |
| JP | 08500060 | | 1/1996 | |
| JP | 09150284 A | | 6/1997 | |
| JP | 200521932 A | | 1/2005 | |

OTHER PUBLICATIONS

Wiilach et al., "Melt expulsion by a coaxial gas jet in trepanning of CMSX-4 with microsecond Nd:YAG laser radiation", Proceeedings of the SPIE, vol. 5063, pp. 435-440, Nov. 18, 2003.

Notification of Transmittal of Translation of the International Preliminary Report on Patentability for corresponding PCT Application No. PCT/DE2009/000911, mailed Jan. 27, 2011, 5 pages.

* cited by examiner

OBLIQUE LASER BEAM CUTTING

CROSS-REFERENCE TO RELATED APPLICATIONS

This application is a continuation of, and claims priority under 35 U.S.C. §120 from, PCT/DE2009/000911, filed on Jun. 26, 2009, and designating the U.S., which claims priority under 35 U.S.C. §119 to German Patent Application No. 10 2008 030 783.1, filed on Jun. 28, 2008. The contents of the prior applications are hereby incorporated by reference in their entirety.

TECHNICAL FIELD

The present disclosure relates to a method for oblique laser beam cutting of a workpiece and a laser processing machine for performing the same.

BACKGROUND

In order to connect two workpieces, such as tubular workpieces, to each other to form an angle of, for example, 90°, the workpieces can first be separated in an oblique manner at an angle of 45° and subsequently welded to each other at the cut edges. For the welding operation, the cut edges should abut each other in the most planar manner possible, which may not, however, be possible when the laser cutting beam is orientated perpendicular relative to the surface of the workpiece surface during the cutting operation since, in this instance, warped cut faces can be produced during separation. In order to prevent the warped cut faces, the laser cutting beam and the supersonic flow of cutting gas promoting the laser cutting are inclined at an angle relative to the surface normal, during a process called "oblique laser beam cutting," in which the angle of inclination is the "oblique cutting angle." If the oblique cutting angle varies during the cutting operation, even in the case of an oblique cut on a tube, a planar cut face can be produced such that the welding of the cut edges is simplified. The oblique cutting operation can be carried out not only on tubular workpieces, but also on thick, plate-like workpieces in order to enable easier welding of the plate-like workpieces together.

However, the oblique laser beam cutting operation may lead to substantial advance rate reductions (e.g., up to 70% for an oblique cutting angle of 45°) and substantial quality reductions compared to conventional laser beam cutting in which a laser cutting beam is orientated perpendicular with respect to the workpiece surface. The advance rate corresponds to a speed of the relative movement between the laser beam and the workpiece, i.e. the advance rate corresponds to the rate of processing workpieces. For example, the cut edges produced during the oblique laser beam cutting operation can have different surface qualities that vary with the oblique cutting angle. In some cases, a substantial burr may be formed at one cut edge, observable to the naked eye, and a rough surface structure may be formed at the other cut edge.

As explained in "Melt Expulsion by a Coaxial Gas Jet in Trepanning of CMSX-4 with Microsecond Nd:YAG Laser Radiation," Proceedings of the SPIE, Vol. 5063, trepanning microholes in turbine blades includes orienting the laser cutting beam at an oblique cutting angle with respect to the workpiece, and orienting the supersonic flow of cutting gas or the cutting gas nozzle parallel to the laser cutting beam with a lateral offset in order to position the stagnation point, i.e., the high-pressure region of the supersonic flow of cutting gas directly over the hole. In this manner, periodic variation of the gas pressure and the thickness of the hardened melt along the wall of the hole can be prevented as would otherwise occur if the gas flow and laser beam were oriented coaxially. Due to the lateral displacement of the laser beam and gas flow, the oscillations can be prevented and gas flow through the hole can be increased such that the melt can be more easily discharged at the lower side of the hole. In order to increase the size of a hole obtained by trepanning, an additional hole can placed next to the original hole such that 50% to 80% of the two holes overlap.

SUMMARY

The present disclosure relates to a method of oblique laser beam cutting and a laser processing machine for performing the same. A supersonic flow of cutting gas discharged from a cutting gas nozzle is orientated at an oblique cutting angle with respect to a workpiece surface. The workpiece and the laser cutting beam are moved relative to each other during the oblique laser beam cutting operation, in which the oblique cutting angle extends along a plane that is perpendicular to a direction of advance. The disclosure also relates to a laser processing machine for oblique laser beam cutting of a workpiece, in which the laser processing machine includes a cutting gas nozzle that can be orientated at an oblique cutting angle relative to a workpiece surface, in which the cutting gas nozzle is operable to produce a supersonic flow of cutting gas. The laser processing machine also includes a movement device operable to move the workpiece and the laser cutting beam relative to each other at an oblique cutting angle that extends along a plane that is perpendicular to a direction of advance, and a laser processing head operable to position a laser cutting beam at a position on the workpiece surface. The method for oblique laser beam cutting and a laser processing machine for performing the same enable, in some implementations, performing high quality cuts on workpieces at high advance rates.

During the relative movement of the laser cutting beam and cutting gas, the position of the laser cutting beam on the workpiece surface is adjusted such that the laser cutting beam strikes the workpiece surface in a high-pressure region formed within the supersonic flow of cutting gas. The position of the high pressure region within the supersonic flow of cutting gas depends, in part, on the oblique cutting angle, which may change during the laser cutting operation. For angles at which the laser cutting beam is not orientated perpendicular to the workpiece surface, the high-pressure region and consequently the position of the laser cutting beam on the workpiece surface are displaced with respect to the nozzle axis of the cutting gas nozzle, in which the nozzle axis corresponds to the center of the supersonic flow of cutting gas.

During an oblique laser beam cutting operation, a large portion of the cutting gas flows away over the workpiece surface such that it is no longer available for the cutting operation and the level of static pressure produced in the cutting gap is low.

By producing a desired displacement between the laser cutting beam and a center of the supersonic flow of cutting gas, the cutting gap can be moved into a region where the flow conditions are improved. The cutting gap is the space between the cut edges provided by the laser cutting. The laser cutting beam or the cutting gap is displaced perpendicularly relative to the direction of advance, which depends on the oblique cutting angle. As a result, a coupling of the supersonic flow of cutting gas into the cutting gap can be improved such that the level of static pressure in the cutting gap can be increased by several orders of magnitude. For example, numerical flow calculations indicate that displacement of the laser cutting beam or cutting gap can, in some implementations, lead to an increase in static pressure level by approximately 350%. An increase of the static pressure level in the cutting gap can, in some implementations, improve the discharge of melt from the hole, which in turn can prevent overheating of the cutting gap as a result of accumulation of metal melt. By improving the discharge of melt, the advance rate of workpieces can be increased. The maximum advance rates achieved are comparable to the advance rates which are dependent on the metal sheet thicknesses and which can be achieved with conventional (perpendicular) laser beam cutting. There can also be produced, at the cut edges at both sides, edge and surface qualities which are comparable to those obtained with perpendicular laser beam cutting.

The variation of the oblique cutting angle is particularly necessary for the oblique cutting of tubes since, in order to produce a planar cut face, at a 45° portion on a tube, the oblique cutting angle perpendicular relative to the direction of advance must be varied, for example, between −45° and 45°. In some implementations, it may be necessary to vary the oblique cutting angle during processing. In the case of perpendicular orientation of the workpiece, i.e., where the oblique cutting angle is 0°, the high-pressure region on the workpiece is at the center of the supersonic cutting gas flow. When the oblique cutting angle is non-zero, the position of the high-pressure region deviates from the center of the supersonic cutting gas flow and varies with the oblique cutting angle so that the position of the laser beam on the workpiece must be tracked in order to ensure that the laser beam remains in the high-pressure region during the oblique cutting operation.

In order to adjust the position of the laser cutting beam, the spacing between the cutting gas nozzle and the workpiece can be determined during the laser beam cutting operation. The spacing between the cutting gas nozzle and workpiece generally changes during the oblique cutting operation as the oblique cutting angle changes. In some implementations, it is useful to determine the spacing between the cutting gas nozzle and the workpiece during the oblique cutting operation, given that the position of the high-pressure region on the workpiece is dependent on the spacing. The spacing then can be used to adjust or adapt the position of the laser cutting beam.

In order to determine the spacing, the capacitance between the cutting gas nozzle and the workpiece can be measured, taking into account the oblique cutting angle, which can affect the capacitance. The capacitive measurement of the spacing between the workpiece and cutting gas nozzle is set forth in EP 0 873 813 B1 and EP 1 684 046 A1, each of which is incorporated herein by reference in its entirety. The orientation of the cutting gas nozzle is changed relative to the workpiece when the oblique cutting angle changes. This can lead to a change of the electrical field lines between the cutting gas nozzle and workpiece and accordingly a change in the capacitance, even though the spacing may be the same. Accordingly, the change of the capacitance with the oblique cutting angle preferably should be taken into account when measuring the spacing.

The position of the laser cutting beam is determined based on a spacing a between the cutting gas nozzle and the workpiece surface and a diameter d of the nozzle opening. The spacing e between the center of the supersonic flow of cutting gas and a laser cutting beam orientated parallel with the supersonic cutting gas flow can be determined as follows in accordance with the three parameters α, a and d:

$$e = \sin(\alpha)(a + (d/2)\sin(\alpha)),$$

where α is the current oblique cutting angle. Each of a, d, and α are provided to a machine control system, which then determines the eccentricity e and subsequently adapts the oblique cutting angle operation in response. The variables a, d, and α can be pre-set in the machine code of the numerical control. It is not necessary that the nozzle diameter correspond to the diameter of a circular nozzle opening. Instead cutting gas nozzles having other geometric shapes such as, for example, elliptical nozzle openings, also can be used. For non-circular shapes, the diameter of the nozzle opening refers to the maximum value of the extent perpendicular relative to the direction of advance.

In some implementations, the laser cutting beam and the nozzle axis of the cutting gas nozzle are oriented parallel with each other and the position of the laser cutting beam on the workpiece surface is adjusted by changing the spacing between the laser cutting beam and the nozzle axis. This can be done by displacing the lens tube with the laser beam relative to a stationary cutting gas nozzle, by displacing the cutting gas nozzle with the laser beam stationary, or by displacing both the lens tube and the cutting gas nozzle. In order to determine the eccentricity e, the above formula can be used. In some implementations, the formula can be adapted to account for the specific operating conditions by the addition of correction factors.

In some implementations, the laser cutting beam and the nozzle axis of the cutting gas nozzle are not oriented in a parallel manner and the position of the laser cutting beam on the workpiece surface is preferably adjusted by skewing a focus of the laser cutting beam. Alternatively, the relatively small beam displacement required for the present application can, for example, also be achieved by directing the laser cutting beam so that it strikes a focusing element, such that its optical axis is inclined relative to the focusing element.

In some implementations, a focusing element and/or a redirecting mirror arranged in the beam path of the laser cutting beam is tilted. A relatively small redirection of the redirecting mirror or the focusing element (e.g., lens) is sufficient to achieve a comparatively large eccentricity of the laser processing beam on the workpiece. In particular, when the redirecting mirror is tilted, the adjustment device is sufficiently remote from the actual operation to become less sensitive to disruptions.

In some implementations, the laser cutting beam is focused with a spacing of more than 50%, preferably more than 70%, of the thickness of the workpiece below the workpiece upper side. In contrast to conventional laser cutting operations, in which the focal point is focused on the workpiece surface or in the upper third or the upper half of the workpiece in order to achieve a funnel-like cutting gap, focusing in the lower half of the workpiece, optionally even below the workpiece lower side, is advantageous in order to ensure high quality of the laser cutting operation.

It is possible to select an inert gas, e.g. nitrogen, as a cutting gas. The supersonic cutting gas flow is generally carried out with inert gases, i.e., an additional energy contribution by reactive gases such as, for example, oxygen, does not take place. The cutting gas in this instance is at a high pressure of more than 10 bar, typically approximately 15 bar, optionally also even 20 bar or more.

The method can also be implemented in a laser processing machine, which additionally includes: an adjustment device for adjusting the position of the laser cutting beam on the workpiece surface relative to the supersonic flow of cutting gas, and a control device which is configured to adjust the position of the laser cutting beam on the workpiece surface in such a manner that the laser cutting beam remains in a high-pressure region formed within the supersonic cutting gas flow during the relative movement. The laser processing machine can be configured for laser beam cutting of tubular workpieces. However, an oblique cutting operation can also take place on other workpieces, such as, for example, plate-like workpieces, in which the oblique cutting angle may remain constant during the oblique laser beam cutting operation.

In some implementations, the laser processing machine has a spacing measuring device for measuring the spacing between the cutting gas nozzle and the workpiece. The spacing measurement can be carried out, for example, optically or mechanically. Using the spacing measuring device, the spacing can be adjusted in such a manner that it is, on the one hand, large enough to prevent the contact of the cutting gas nozzle with the workpiece or portions which protrude therefrom and, on the other hand, small enough to allow good coupling of the cutting gas beam in the workpiece.

In some implementations, the spacing measuring device is configured to measure the capacitance between the cutting gas nozzle and the workpiece and, taking into account the influence of the oblique cutting angle on the capacitance, to determine the spacing between the cutting gas nozzle and the workpiece surface. To this end, there can be stored in the spacing measuring device characteristic lines which define the relation between capacitance and spacing at a respective oblique cutting angle (for example, at 0°, 15°, 30°, 45°, etc.). The characteristic lines can be achieved using calibration measurements, in which the (known) spacing between the cutting gas nozzle and the workpiece surface is varied with a fixed oblique cutting angle.

In some implementations, the control device is configured to determine the position of the laser cutting beam adapted to the oblique cutting angle based on the spacing between the cutting gas nozzle and the workpiece surface and based on the diameter of the nozzle opening. The position can be determined using the formula set out above.

In some implementations, the adjustment device includes a displacement device for adjusting the position of the laser cutting beam on the workpiece surface by changing the spacing between the nozzle axis of the cutting gas nozzle and the laser cutting beam, which is orientated parallel with the nozzle axis. An example of a displacement device includes a linear motor, which can be fit to the laser processing head and which allows the movement of the cutting gas nozzle relative to the laser processing head in a spatial direction that is typically oriented perpendicular to the nozzle axis. Alternatively or in addition, the lens tube, or optical elements such as, for example, redirecting mirrors, can also be displaced or tilted in the beam guide, in order to change the position of the laser cutting beam in the nozzle opening and thus to achieve a lateral displacement between the nozzle axis and laser cutting beam.

In some implementations, the adjustment device includes a tilting device for tilting a focusing element and/or a redirecting mirror that is arranged in the beam path of the laser cutting beam upstream of the focusing element in order to adjust the position of the laser cutting beam on the workpiece surface using skewed focusing. By skewing a focus, the beam displacement or the eccentricity of the laser cutting beam can also be adjusted relative to the supersonic cutting gas flow on the workpiece surface, the nozzle axis of the cutting gas nozzle and the beam axis of the laser cutting beam not extending parallel with each other in this case.

In some implementations, the laser cutting beam can extend eccentrically through a nozzle opening that is not radially symmetrical. By rotating the nozzle body, a lateral displacement between the laser processing beam and the supersonic cutting gas flow can be produced.

The method disclosed herein can be implemented in a computer program product which has computer readable code for setting up a processing program of a laser processing machine. The processing program can be executed on the control device of the laser processing machine. The computer program product may include a computer-readable medium such as, for example, a disk or other data carrier on which program code is stored. The computer program product can be suitable for setting up the processing program based on data which can be provided by a user using an appropriate operating surface and which relates to a desired oblique cutting operation (type of workpiece, type of contour, etc.). The processing program can be set up before the workpiece is processed and can be transmitted to the control device before processing through a computer-readable medium or through another form of data transmission.

Other advantages will be appreciated from the description and the drawings. The features set out above and the features set out below can be used individually or together in any combination. The embodiments shown and described are intended to be understood not as a conclusive listing but instead are of an exemplary nature to describe the invention.

DETAILED DESCRIPTION

Figure 1A:
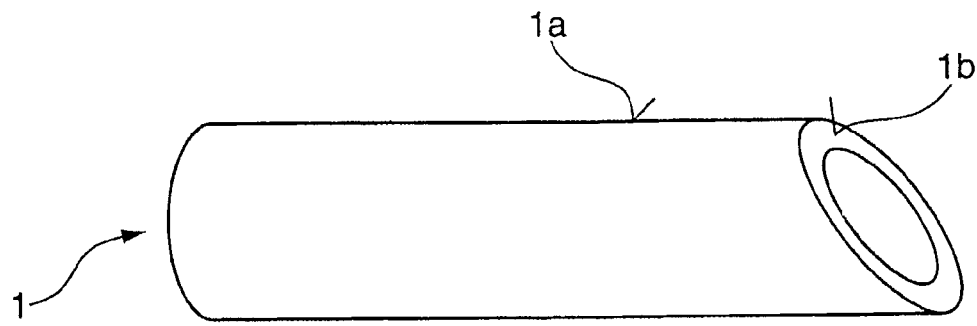
FIG. 1a is a schematic illustration of a tubular workpiece.

FIG. 1a is a tubular workpiece 1, on which a 45° portion is formed with a planar cut face 1b which can be welded to an additional tubular workpiece (not illustrated) with a planar cut face, with a 90° angle being formed along a thin weld seam which connects the cut faces. In order to produce the planar cut face 1b, an oblique cutting operation is carried out on the tubular workpiece 1, in which the oblique cutting angle α (see FIG. 1b) is varied in the range between −45° and 45° since, in a conventional cutting operation with a constant oblique cutting angle α, a warped cut face would be produced on the workpiece 1.

Figure 1B:
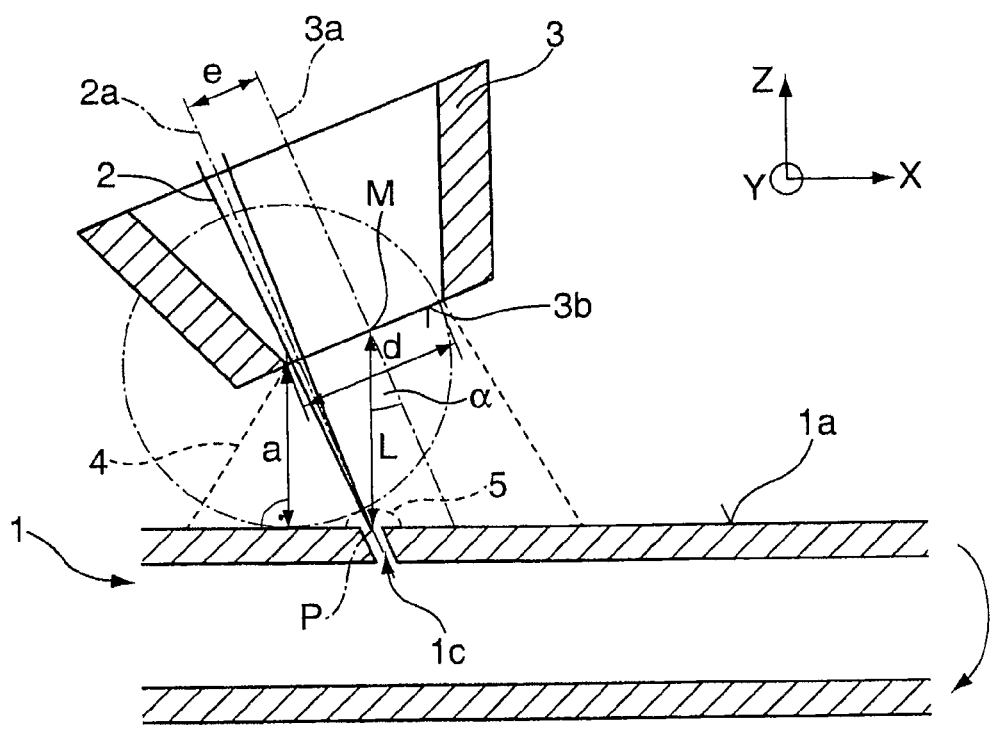
FIG. 1b is a schematic illustration of a cutting gas nozzle and workpiece during an oblique laser beam cutting operation.

FIG. 1b shows a snapshot of such an oblique laser beam cutting operation on the tubular workpiece 1 at an oblique cutting angle α of approximately −20°, in which a beam axis 2a of the laser cutting beam 2 is angled with respect to the normal of the workpiece surface 1a. The nozzle axis 3a is orientated parallel with the beam axis 2a of the laser cutting beam 2. A supersonic cutting gas flow 4 is discharged from the cutting gas nozzle 3 and is directed onto the workpiece surface 1a. The supersonic cutting gas flow 4 forms a high-pressure region 5 on the workpiece surface 1a, in which the high-pressure region 5 is offset relative to the nozzle axis 3a of the cutting gas nozzle 3. The position of the high-pressure region 5 depends on the oblique cutting angle α, the diameter d of the cutting gas nozzle 3, and the spacing a between the edge of the nozzle opening 3b and the workpiece surface 1a.

In order to position the laser cutting beam 2 in the high pressure region 5 on the workpiece surface 1a, the beam axis 2a of the laser cutting beam 2 and thus the cutting gap 1c is displaced by a spacing (eccentricity) e with respect to the nozzle axis 3a during the oblique laser beam cutting operation. In order to determine the eccentricity e in accordance with the parameters α, d and a, a geometric model is applied, in which the model is based on the momentum conservation law: the highest pressure and consequently the center of the high-pressure region 5 are located where the atoms of the supersonic cutting gas flow 4 strike the workpiece surface 1a in a substantially perpendicular manner. If it is assumed that the gas molecules are discharged substantially concentrically from the nozzle opening 3b, the position P at which the molecules strike the workpiece surface 1a in a substantially perpendicular manner is located directly below the center point M of the nozzle opening 3b and is separated from the workpiece surface 1a by a length L.

As shown in FIG. 1b, e=L sin (α), where the length L=a+d/2 sin (α). Accordingly, the following relationship for the eccentricity between the beam axis 2a of the laser cutting beam 2 and the nozzle axis 3a of the laser processing nozzle 3 can be obtained:

$$e=\sin(\alpha)(a+(d/2)\sin(\alpha)).$$

Using the foregoing formula, it is possible to determine the eccentricity e that must be adjusted so that the laser cutting beam 2 remains in the high-pressure region 5 when the tubular workpiece 1 is rotated about an advance direction Y of an XYZ co-ordinate system. In order to form the planar cut in the workpiece 1 having the 45° angle, the tubular workpiece 1 is rotated about the advance direction Y. As a result of the rotation, the oblique cutting angle α may change. Accordingly, the position P of the laser cutting beam 2 can be monitored to maintain the laser cutting beam 2 in the high-pressure region 5.

Figure 2A:
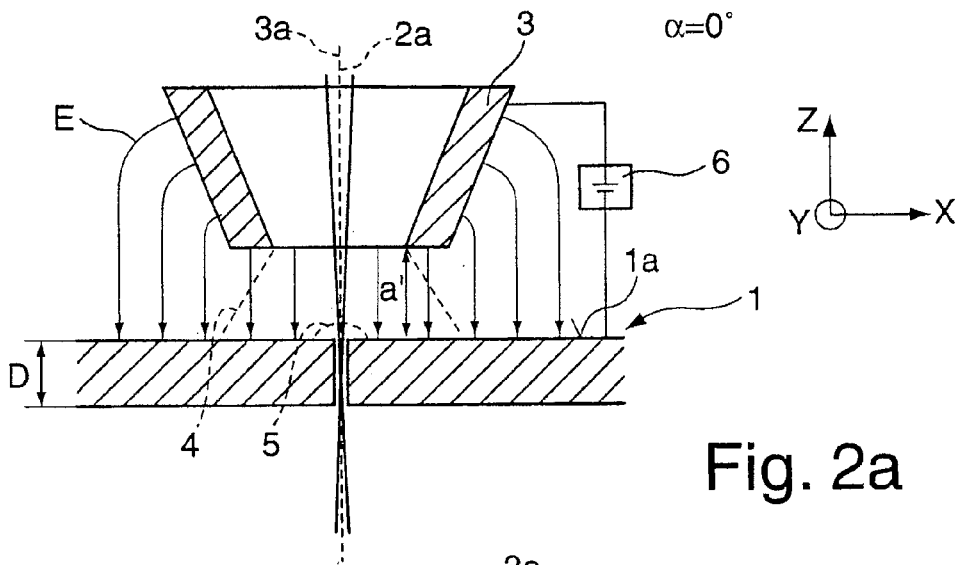
FIGS. 2a-2c are schematic illustrations of the electrical field strength between a workpiece and a cutting gas nozzle at an oblique cutting angle of 0°, 30° and 45°, respectively.
Figure 2B:
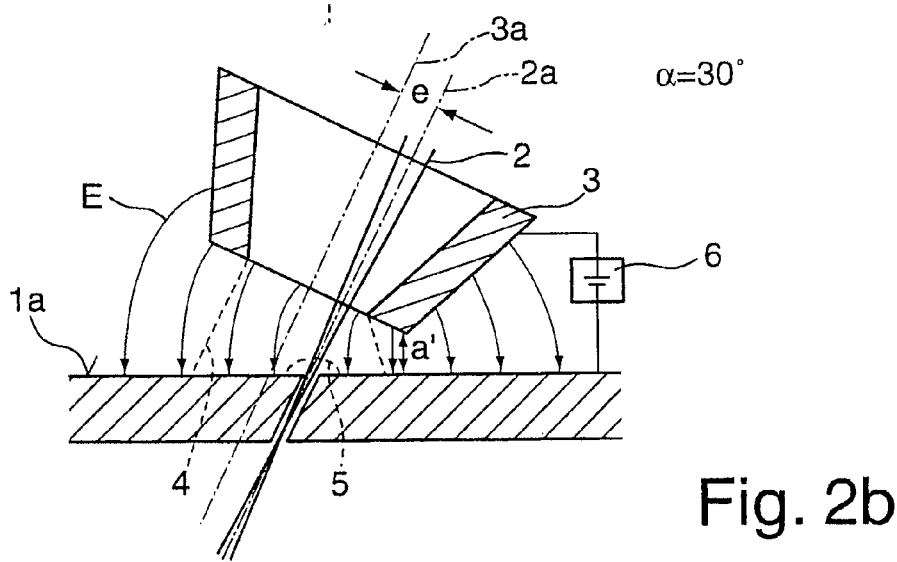
Figure 2C:
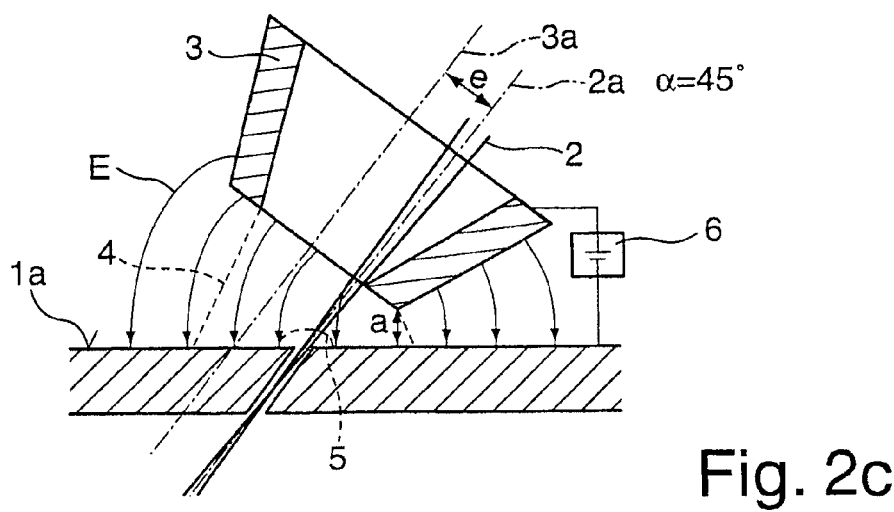

FIGS. 2a-2c show examples of a technique for monitoring and optionally adjusting the spacing a between the cutting gas nozzle 3 and the workpiece 1 during the oblique cutting operation, in which the technique employs a capacitive spacing measuring device 6. The capacitive spacing measuring device 6 can be constructed as disclosed in EP 1 684 046 A1 and EP 0 873 813 B1. The spacing measuring device 6 produces a potential difference between the metal nozzle body of the cutting gas nozzle 3 and the workpiece 1. Generally, the workpiece 1 is metal so an electrical field E is formed between the metal nozzle body and the workpiece 1. Electric field lines are shown in FIGS. 2a-2c for oblique cutting angles α of 0°, 30° and 45°, respectively. Depending on the capacitance measured between the cutting gas nozzle 3 and the metal workpiece 1, the position of the field lines E and consequently the capacitance between the workpiece 1 and cutting gas nozzle 3 may change. In order to determine the spacing a with a predetermined oblique cutting angle α, it is possible, for example, to take a capacitance measurement at various known spacings in order to obtain characteristic field lines for the different spacings in accordance with the capacitance at a constant oblique cutting angle. For measurements at oblique cutting angles α where no such characteristic field line has been determined, it is possible to interpolate between the known characteristic lines. The capacitively measured spacing a' is determined between the outer edge of the cutting gas nozzle 3 and the workpiece 1 (i.e., the distance between the closest point of the cutting gas nozzle to the workpiece), whereas the spacing a shown in FIG. 1b is defined between the edge of the nozzle opening 3b and the workpiece 1. With a known nozzle geometry for the cutting gas nozzle 3 in the spacing measuring device 6, the capacitively measured spacing a' can be converted to provide the spacing a between the edge of the nozzle opening 3a and the workpiece 1.

FIGS. 2a-2c also show the beam axis 2a of the laser cutting beam 2 orientated at the different oblique cutting angles α with a different spacing e with respect to the nozzle axis 3a in order to keep the cutting gas beam 2 in the high-pressure region 5. Furthermore, the laser cutting beam 2 is focused beneath the workpiece surface 1a at a distance from the workpiece surface 1a that is more than 50% of the thickness D of the workpiece 1. As a result of such focusing, the quality of the cut edges with an oblique cutting operation can be improved. The focusing can also be carried out at a distance from the workpiece surface that is more than 70% of the thickness of the workpiece 1; depending on the operating conditions, the laser cutting beam 2 can also be focused below the lower side of the workpiece 1.

Figure 3A:
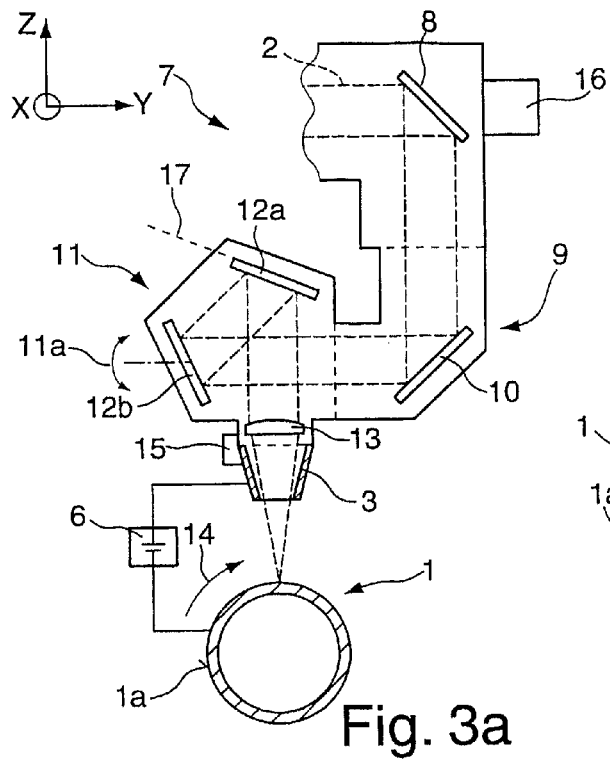
FIG. 3a is a schematic illustration of a laser processing machine.

FIG. 3a is a schematic diagram of a laser processing machine 7 that is configured to carry out the method described above on the tubular workpiece 1. In the laser processing machine 7, the laser cutting beam 2 is redirected using a beam guide (not shown) onto an adaptive redirecting mirror 8 and subsequently enters a laser processing head 9 in which another redirecting mirror 10 is arranged. The beam 2 then is redirected into a housing portion 11 of the laser processing head, which can be rotated using a rotation device 11a (see double-headed arrow) about an axis parallel with the Y direction in order to be able to adjust different oblique cutting angles α on the workpiece 1. In the rotatable housing portion 11 are a first and second redirecting mirror 12a, 12b and a focusing lens 13 for focusing the laser cutting beam 2 on the workpiece 1 or below the workpiece surface 1a. The focal position of the laser beam 2 can be changed by changing the shape of the adaptive redirecting mirror 8 using, for example, piezoelectric elements or by applying fluid pressure to a rear side of the redirecting mirror 8. As a movement device for moving the workpiece 1 in the ZY plane, the laser processing machine 7 has a clamping chuck 14 that produces a rotational movement of the workpiece 1. The clamping chuck 14 is also capable of simultaneously moving the workpiece 1 in the X direction in order to produce the 45° portion shown in FIG. 1a. Optionally, the laser processing head 9 may also be displaced in the X direction using conventional displacement units, e.g., linear motors, in order to produce the 45° portion shown in FIG. 1a on the workpiece 1.

In order to produce the eccentricity of the laser cutting beam 2 relative to the cutting gas nozzle 3 secured to the laser processing head 9, the laser cutting beam 2 can be moved in the X direction using a displacement device 15 such as, for example, a conventional linear drive. A control device 16 can be used to control the displacement device 15 such that the laser cutting gas beam 2 is orientated in the X direction with a desired spacing relative to the supersonic cutting gas beam 4. The formula set out above for the eccentricity e can be stored in the machine control system of the laser processing machine 1 so that the control device 16 can calculate the optimum eccentricity itself.

Figure 3B:
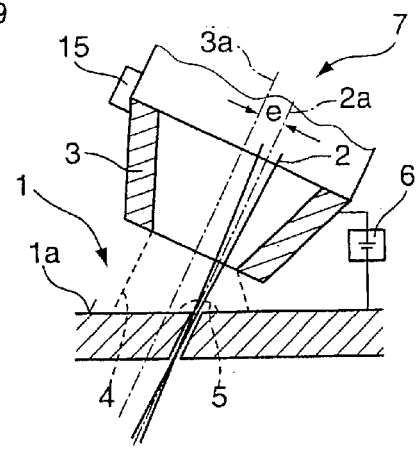
FIG. 3b is a schematic illustration of a cutting gas nozzle and a workpiece.

The laser processing machine 7 of FIG. 3a can also be configured for oblique cutting of a plate-like workpiece 1, as illustrated in FIG. 3b, in which the advance direction extends in the X direction. The eccentricity e between the laser beam axis 2 and nozzle axis 3a can be adjusted in the manner described above. When cutting plate-like workpieces, such as the workpiece 1 shown in FIG. 3b, it is not necessary to vary the oblique cutting angle during the laser beam cutting. Instead, the oblique cutting angle can maintain a constant value such that a planar oblique cut edge is formed on the workpiece 1. When connecting two such plate-like workpieces at an angle of, for example, 90° along two oblique cutting edges, the workpieces abut each other in a planar manner and can be more readily welded together. It is also possible to cut plate-like workpieces with complex geometric shapes, which require a modification of the oblique cutting angle during the laser beam cutting operation.

Figure 4A:
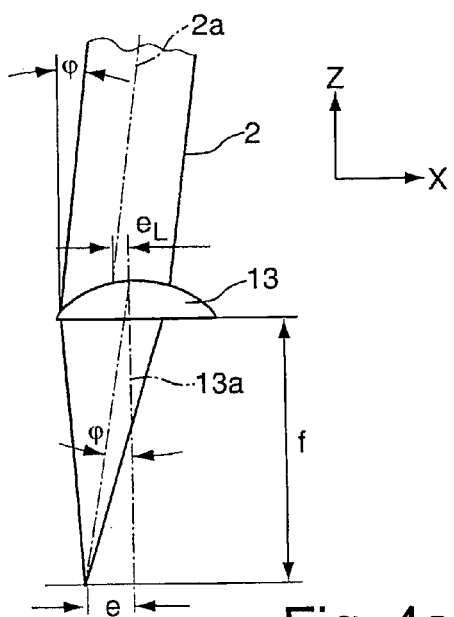
FIG. 4a is a schematic illustration of a skewed focusing of a laser cutting beam.

In order to produce a displacement between the beam axis 2a of the laser cutting beam 2 and the supersonic cutting gas flow 4 or the nozzle axis 3a, an optical element, such as the redirecting mirrors 12a, 12b, can be displaced or tilted an optical element. It is also possible to obtain the eccentricity e on the workpiece surface 1a by skewing a focus of the focusing lens 13, as shown in FIG. 4a, given that, during the oblique cutting operation, the laser beam axis 2a does not have to be orientated parallel with the nozzle axis 3a.

For skewed focusing, the first redirecting mirror 12a can be tilted using a conventional tilting device 17 (see, e.g., FIG. 3), such as, for example, a piezoelectric actuator so that the laser cutting beam 2 does not strike the focusing lens 13 in a perpendicular manner, but instead at an angle φ with respect to the Z direction. In addition, the laser beam axis 2a is offset in the X direction by a spacing $e_L$ with respect to the optical axis 13a of the focusing lens 13. The titling angle φ required to produce a desired eccentricity e on the workpiece 1 can be determined from the spacing between the redirecting mirror 12a and the focusing lens 13 and the focal length f using geometric considerations. As an alternative, the focusing lens 13 can also be tilted in order to achieve the desired lateral displacement between the laser cutting beam 2 and nozzle axis 3a. It is not necessary to produce a spacing $e_L$ between the optical axis 13a of the focusing lens 13 and the laser beam axis 2a for the skewed focusing, but for the laser beam axis 2a to preferably intersect with the focusing lens 13 centrally at the optical axis 13a.

Figure 4B:
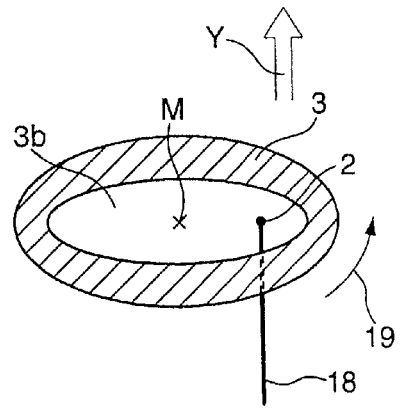
FIG. 4b is a schematic illustration of a rotatable cutting gas nozzle with an elliptical cross-section.

Another possibility for producing a lateral displacement between the laser cutting beam 2 and the supersonic cutting gas flow is shown in FIG. 4b. The laser cutting beam 2, behind which a cutting gap 18 is formed in the advance direction Y, is laterally offset from the center M of the elliptical nozzle opening 3b. The cutting gas nozzle 3 can be rotated about the laser beam axis of the laser cutting beam 2 using a rotation device 19, whereby the position of the center M of the nozzle opening 3b in the X direction changes and a lateral displacement is also produced between the laser cutting beam 2 and the center M of the nozzle opening 3b or the supersonic cutting gas flow. In order to improve the cutting result, the laser cutting beam 2 can be advanced in the Y direction in the cutting gas nozzle without simultaneously adjusting the eccentricity by rotating the cutting gas nozzle.

In order to achieve appropriate operating conditions for the oblique cutting operation, an inert gas, for example, nitrogen, can be used as a cutting gas. The cutting gas is provided at a high pressure of typically more than 10 bar in a pressure chamber (not illustrated) of the laser cutting head 9 adjacent to the cutting gas nozzle 3. Furthermore, the spacing between the cutting gas nozzle 3 and the workpiece surface 1a can be selected so as to be as small as possible in order to achieve optimum cutting results. Furthermore, for the oblique cutting operation at large oblique cutting angles of, for example, 45°, the (inner) diameter of the cutting gas nozzle 3 can be selected to be large, for example, 2 mm or more. In addition, nozzle cross-sections other than round nozzle cross-sections can be selected, as shown in FIG. 4b.

The operation described above for oblique laser beam cutting is substantially independent of the material processed and the workpiece thickness and can be used in particular for cutting high-grade steel, construction steel or aluminium. The oblique cutting operation is not limited to the separation cutting of tubular workpieces but instead any contours, for example, on plate-like workpieces. It is possible to achieve both a high quality of the cut edges produced during the separation cut and advance rates that are comparable with those with perpendicular laser beam cutting with respect to the effective cutting depth.

A number of embodiments of the invention have been described. Nevertheless, it will be understood that various modifications may be made and other embodiments are within the scope of the following claims.

What is claimed is:

1. A method for oblique laser beam cutting of a workpiece, the method comprising:
    discharging a supersonic flow of cutting gas from a cutting gas nozzle, wherein a nozzle axis of the cutting gas nozzle is orientated at an oblique cutting angle with respect to a surface of the workpiece;
    moving at least one of the workpiece or a laser beam relative to one another, the oblique cutting angle extending along a plane that is perpendicular relative to a direction of advance of the workpiece or the laser beam;
    cutting the workpiece with the laser beam;
    determining a spacing between the cutting gas nozzle and the workpiece during the cutting of the workpiece with the laser beam,
    wherein determining the spacing comprises measuring a capacitance between the cutting gas nozzle and the workpiece, and identifying the spacing based on the measured capacitance and the oblique cutting angle; and
    adjusting, based on the determined spacing, a position of the laser beam so that the laser beam strikes the surface of the workpiece in a high pressure region within the supersonic flow of the cutting gas for the oblique cutting angle at which the nozzle axis is oriented.

2. A method according to claim 1, further comprising determining, prior to adjusting the position of the laser beam, the position of the laser cutting beam based on the spacing between the cutting gas nozzle and the workpiece surface, and a diameter of an opening of the cutting gas nozzle.

3. A method according to claim 1, further comprising orienting the laser beam and an axis of the cutting gas nozzle to be parallel with each other, wherein adjusting the position of the laser cutting beam on the workpiece surface comprises changing a spacing between the laser beam and the axis of the cutting gas nozzle.

4. A method according to claim 1, wherein adjusting the position of the laser beam on the workpiece surface comprises skewing a focus of the laser beam.

5. A method according to claim 1, further comprising focusing the laser beam to a position below the surface of the workpiece, wherein the position is beneath the workpiece surface by more than 50% of a thickness of the workpiece.

6. A method according to claim 1, wherein identifying the spacing comprises calculating the spacing based on a predefined relationship between the measured capacitance and the oblique cutting angle.

7. The method according to claim 1, wherein the laser beam propagates through the cutting gas nozzle, and wherein the laser beam axis is either parallel to and offset from the nozzle axis or the supersonic cutting gas flow, or the laser beam axis is tilted with respect to the optical axis of a focusing lens.

8. A method according to claim 4, wherein skewing a focus of the laser beam comprises passing the laser beam through at least one of a focusing element or a redirecting mirror.

9. A laser processing machine for oblique laser beam cutting of a workpiece, the laser processing machine comprising:
- a cutting gas nozzle configured to provide a supersonic flow of cutting gas during operation of the laser processing machine;
- a laser processing head configured to position the laser beam on a surface of the workpiece;
- an adjustment device coupled to the laser processing head and configured to adjust a position of the laser beam on the surface of the workpiece relative to the supersonic flow of cutting gas;
- a spacing measuring device configured to measure a spacing between the cutting gas nozzle and the workpiece during cutting of the workpiece based on a capacitance between the cutting gas nozzle and the workpiece and based on an oblique cutting angle of a nozzle axis of the cutting gas nozzle with respect to the workpiece surface; and
- an electronic control device configured to control, during operation of the laser processing machine, the adjustment device to adjust the position of the laser beam based on the spacing measured by the spacing measuring device so that the laser beam strikes the workpiece surface in a high pressure region within the supersonic cutting gas flow for the oblique cutting angle at which the nozzle axis is oriented.

10. The laser processing machine according to claim 9, wherein the control device is configured to determine the position of the laser beam based on the spacing between the cutting gas nozzle and the surface of the workpiece, and a diameter of an opening in the nozzle.

11. The laser processing machine according to claim 9, wherein the adjustment device includes a displacement device operable to change a spacing between the cutting gas nozzle axis and the laser beam.

12. The laser processing machine according to claim 9, wherein the adjustment device includes a tilting device operable to tilt at least one of a focusing element or a redirecting mirror arranged in a beam path of the laser beam.

13. The laser processing machine according to claim 9, wherein the control device is configured to calculate the spacing based on a pre-defined relationship between the measured capacitance and the oblique cutting angle.

14. The laser processing machine according to claim 9, further comprising a focusing lens, wherein the laser beam axis is either parallel to and offset from the nozzle axis or the supersonic cutting gas flow, or tilted with respect to the optical axis of the focusing lens.

\* \* \* \* \*

UNITED STATES PATENT AND TRADEMARK OFFICE
CERTIFICATE OF CORRECTION

PATENT NO. : 9,108,271 B2  
APPLICATION NO. : 12/976327  
DATED : August 18, 2015  
INVENTOR(S) : Florian Sepp and Volker Metsch Page 1 of 1

It is certified that error appears in the above-identified patent and that said Letters Patent is hereby corrected as shown below:

Claims

In column 10, line 51 in Claim 3, delete "workpiece surface" and insert --surface of the workpiece--.

In column 10, line 55 in Claim 4, delete "workpiece surface" and insert --surface of the workpiece--.

In column 10, lines 59-60 in Claim 5, delete "workpiece surface" and insert --surface of the workpiece--.

Signed and Sealed this  
Fifth Day of April, 2016

Michelle K. Lee  
*Director of the United States Patent and Trademark Office*